United States Patent [19]
Unvert et al.

[11] Patent Number: 4,550,209
[45] Date of Patent: Oct. 29, 1985

[54] PROCESS FOR THE PREPARATION OF LINEAR POLYETHYLENEPOLYAMINES BY REACTING MONOETHANOLAMINE WITH ETHYLENEDIAMINE IN THE PRESENCE OF AN INTERCALATIVELY ACTIVE CATALYST

[75] Inventors: Susan D. Unvert, Austin; Steven H. Vanderpool, New Braunfels; John F. Knifton, Austin, all of Tex.

[73] Assignee: Texaco Inc., White Plains, N.Y.

[21] Appl. No.: 634,713

[22] Filed: Jul. 26, 1984

[51] Int. Cl.[4] ............................................. C07C 85/06
[52] U.S. Cl. .................................... 564/479; 564/512
[58] Field of Search ................................ 564/479, 512

[56]         References Cited
       FOREIGN PATENT DOCUMENTS 2083021  3/1982  United Kingdom ................ 564/479

OTHER PUBLICATIONS

Kirk–Othmer, *Encyclopedia of Chem. Tech.*, 2nd Ed., vol. 22, pp. 635, 657–658.

*Primary Examiner*—Charles F. Warren
*Assistant Examiner*—John A. Sopp
*Attorney, Agent, or Firm*—Jack H. Park; Kenneth R. Priem

[57]         ABSTRACT

Essentially linear polyethylenepolyamines are prepared by reacting monoethanolamine with ethylenediamine in the presence of an intercalatively catalytically active tetravalent zirconium polymeric reaction product of an organo phosphonic acid or an ester thereof with a compound of tetravalent zirconium reactive therewith, such as zirconium trimethylene diphosphonate prepared by reacting trimethylenediphosphonic acid wth zirconyl chloride.

14 Claims, No Drawings

PROCESS FOR THE PREPARATION OF LINEAR POLYETHYLENEPOLYAMINES BY REACTING MONOETHANOLAMINE WITH ETHYLENEDIAMINE IN THE PRESENCE OF AN INTERCALATIVELY ACTIVE CATALYST

BACKGROUND OF THE INVENTION

1. Technical Field of the Invention

This invention relates to a method for the preparation of predominantly linear polyethylenepolyamines by reacting ethylenediamine with monoethanolamine in the presence of an intercalatively catalytically active tetravalent zirconium polymeric reaction product of an organo-phosphonic acid or an ester thereof with a compound of tetravalent zirconium reactive therewith.

The catalysts that are used in accordance with the present invention are solid polymeric reaction products of an organo-phosphonic acid or an ester thereof with a tetravalent zirconium compound. The polymeric reaction products display intercalation activity, have a layered structure, and may be further characterized as having a molar ratio of phosphorous to zirconium of about 2 to 1 and as having a molecular structure such that the organo groups of the polymeric reaction product are covalently bonded to phosphorous through a carbon linkage and such that the phosphorous is linked to the zirconium through an oxygen linkage.

2. Prior Art

Heretofore, polyethylenepolyamine compounds such as diethylenetriamine, triethylenetetramine and the higher homologs have been produced by the reaction of an alkyl halide such as ethylene dichloride with an amine such as ammonia or ethylenediamine at elevated temperatures and pressures. Normally, relatively high yields of predominantly noncyclic polyethylenepolyamine compounds are obtained from this process with varying yields of heterocyclic amines. The large amounts of energy required to produce the reactants as well as the difficult separation procedures required to recover the more valuable linear polyethylenepolyamines diminish the utility of the ethylene dichloride process. The hydrohalide salts of ammonia and the polyethylenepolyamine products must also undergo difficult and time consuming caustic neutralization to yield the free polyethylenepolyamines.

Investigators have found that more linear products can also be obtained in a catalytic conversion. Thus, Ford et al. U.S. Pat. No. 4,316,840 discloses the preparation of polyalkylenepolyamines from ethylenediamine utilizing a metal nitrate or sulfate as a catalyst. U.S. Pat. No. 4,314,083 discloses the reaction of ethylenediamine with monoethanolamine to prepare noncyclic polyalkylenepolyamines using, as a catalyst, a salt of a nitrogen or sulfur-containing compound.

Ford et al. U.S. Pat. No. 4,362,886 discloses a process for preparing predominantly non-cyclic polyalkylenepolyamine compounds from feedstocks such as ethylenediamine and ethanolamine using a compound of antimony, bismuth or arsenic as a catalyst. In Ford et al. U.S. Pat. No. 4,399,308, a Lewis acid halide is used to catalyze the reaction. In European patent application No. 0073520, Ford et al. disclose the use of a phosphorous-containing substance such as boron phosphate or a salt of a sulfur-containing substance such as beryllium sulfate, boron sulfate or ammonium sulfate as the catalyst.

Brennan et al. U.S. Pat. No. 4,036,881 discloses the use of phosphorous-containing catalysts to catalyze the reaction of ethylenediamine with monoethanolamine.

In copending application Ser. No. 455,154 in the name of Vanderpool filed Jan. 3, 1983, and entitled "Catalytic Preparation of Linear Polyethylenepolyamines with Supported Catalyst", a process for the preparation of linear polyethylenepolyamines is disclosed wherein monoethanolamine is reacted with ethylenediamine in the presence of zirconium silicate to which phosphorous has been thermally bonded. Copending Vanderpool patent application Ser. No. 455,160 filed Jan. 3, 1983, and entitled "Catalysts and Preparation of Linear Polyethylenepolyamines Therewith" discloses the use of zirconia having phosphorous thermally bonded thereto as a catalyst for promoting the reaction of ethylenediamine with monoethanolamine to provide essentially linear polyethylenepolyamine reaction products.

French Pat. No. 1,317,359 dated Feb. 8, 1963, discloses the preparation of granulated zirconium phosphate and its use as an ion-exchange resin. Winkler et al. in a 1966 publication [Deutsche Akad. Wiss., Berlin, Germany, Z. Anorg. Allgen. Chem. 346 (1–2), 92–112 (1966)] disclose compounds of the general formula $HX^vP_2O_3$ wherein X represents arsenic, antimony and mixtures thereof. Also disclosed are compounds of the general formula $H_2X^{iv}P_2O_3$, wherein X represents silicon, germanium, tin, lead, titanium and zirconium. It is shown that the group IV phosphates have cation exchange properties.

DiGiacomo et al. U.S. Pat. No. 4,256,872 issued Mar. 17, 1981, contains a comprehensive disclosure of layered organo phosphorous inorganic polymers and methods of preparing such polymers. The patentees broadly disclose a process for the production of inorganic polymers having organo groups covalently bonded to phosphorous atoms and in which the phosphorous atoms are, in turn, covalently bonded by an oxygen linkage to a tetravalent metal atom to provide layered crystalline reaction products wherein the organo groups are present on the apparent and interlamellar surfaces. It is pointed out by the patentees that many inorganic solids crystallize to form a layered structure in which sheets or slabs of a thickness of from 1 to 7 atomic diameters lie upon one another. Such polymers can have strong ionic or covalent bonds within the intra sheet structure while having relatively weak van der Waals or hydrogen bonding between the interlamellar basil surfaces in the direction perpendicular to their planes. As a consequence, "guest" species of other chemical compounds can be incorporated between the lamella. The process, designated by the patentees as "intercalation" is one wherein the incoming guest molecules cleave the layers apart and occupy the region between them leaving the layers virtually intact since the crystals swell in only one dimension, i.e., perpendicular to the layers. A related disclosure is found in DiGiacomo et al. U.S. Pat. No. 4,298,723 issued Nov. 3, 1981.

SUMMARY OF THE INVENTION

This invention is directed to the preparation of essentially linear polyethylenepolyamines by reacting monoethanolamine with ethylenediamine in the presence of an intercalatively catalytically active tetravalent zirconium polymeric reaction product of an organo phosphonic acid or an ester thereof with a compound of tetravalent zirconium reactive therewith. The catalysts of the present invention are prepared by reacting a tetravalent zirconium compound such as a tetravalent zirconium halide, nitrate, alkoxide, etc., with an organo phosphonic acid or an ester thereof to provide a solid crystalline reaction product having lamellar surfaces between which the organo groups are covalently bonded to phosphorous through a carbon or a phosphorous linkage and wherein phosphorous is interlamellarly linked to the zirconium through an oxygen linkage. In general, the reaction products will have a molar ratio of phosphorous to zirconium of about 2 to 1.

DETAILED DESCRIPTION

Catalyst Compositions

The raw materials used to prepare the catalyst compositions of the present invention include an organo phosphonic acid or an ester thereof and a tetravalent zirconium compound. Illustrative of the organo phosphonic acids and esters thereof that may be used are alkylenediphosphonic acids such as trimethylenediphosphonic acid; carboxyalkylphosphonic acids, such as carboxymethyl phosphonic acid; arylphosphonic or arylalkylphosphonic acids such as phenylphosphonic acids.

The tetravalent zirconium compounds that may be used include zirconium compounds such as zirconyl chloride, zirconyl bromide, etc., zirconyl nitrate, zirconium (IV) alkoxide (such as zirconium (IV) propoxide, etc.

The method of preparation of the catalyst compositions is disclosed in Di Giacomo et al. U.S. Pat. Nos. 4,256,872 and 4,298,723 (see for example, Example 2 in U.S. Pat. No. 4,298,723).

The pelleted catalyst compositions of the present invention are normally employed as a fixed bed of catalyst in a continuous reaction system. In a continuous process of this nature, the time of contact of the reactants with the catalyst is one of the interrelated factors that those skilled in the art will adjust, along with temperature, pressure, bed geometry, pellet size, etc., in order to obtain a desired rate of reaction and, hence, a desired percentage of conversion of the reactants. Thus, in a continuous process, it is not necessary to drive the reaction to completion because unreacted feedstock components can be recycled to the reactor.

It is customary to use cylindrically-shaped catalyst pellets having a diameter essentially equal to the length thereof, such as diameters and lengths ranging from about 1/32" to about ⅜". It will be understood that the shape and dimensions of the pellets are not critical to the present invention and that pellets of any suitable shape and dimensions may be used as desired, by one wishing to practice the process of the present invention.

When cylindrical pellets of catalyst of the type described above are used, the weighted hourly space velocity may be varied within wide limits (e.g., 0.1 to 5 w/hr/w) in order to obtain a desired rate of conversion, as explained above. Normally, space velocities of about 0.5 to 2 w/hr/w will be employed.

The catalysts of the present invention may also be employed in powdered form, in which case the reaction can be conducted on a batch basis in an autoclave. When the reaction is conducted in an autoclave, the reaction conditions to be employed include a temperature within the range of about 250° to about 400° C., at autogeneous pressure, a molar ratio of ethylenediamine to monoethanolamine of about 0.5 to 5.0 and a reaction time of about 0.5 to about 6 hours. Higher or lower pressures may be used, if desired, but there is no particular advantage in doing so.

Preparation of Polyethylenepolyamines

The catalyst compositions of the present invention catalyze the reaction of ethylenediamine and monoethanolamine at a temperature of from about 250° C. to about 400° C., preferably from about 300° C. to about 350° C. The ratio of ethylenediamine to monoethanolamine may range from about 1:2 to about 5:1. Higher temperatures or higher pressures may be used, but there is no particular advantage in using higher temperatures and/or pressures.

There are many compounds which can be formed from the reaction of ethylenediamine and monoethanolamine besides the preferred linear polyethylenepolyamines such as diethylenetriamine, triethylenetetramine, tetraethylenepentamine and pentaethylenehexamine. Less desirable cyclics and other compounds, such as piperazine, N-(2-aminoethyl)ethanolamine and N-(2-aminoethyl) piperazine, are also formed. The more desired linear polyethylenepolyamines can be easily recovered from the reaction product mixture by conventional methods such as distillation. Such distillation recovery methods are well known in the art. An outstanding advantage of the claimed invention is that the lower molecular weight polyethylenepolyamines recovered from the reaction mixture can be further reacted with monoethanolamine to produce a larger percentage of the higher molecular weight linear polyethylenepolyamines.

The following examples will further illustrate the preparation of predominantly linear polyethylenepolyamines from ethylenediamine and monoethanolamine by the use of the catalyst compositions of the present invention. They are given by way of illustration and not as limitations on the scope of the invention. Thus, it will be understood that reactants, proportions of reactants, and time, temperature and pressure of the reaction steps may be varied with much the same results achieved.

For purposes of convenience and brevity, the reactant compounds employed and the products obtained have been abbreviated in the following examples and table. The abbreviations employed for these various compounds are:

EDA—ethylenediamine
MEA—monoethanolamine
PIP—piperazine
DETA—diethylenetriamine
TETA—triethylenetetramine
TEPA—tetraethylenepentamine
AEEA—N-(2-aminoethyl)ethanolamine
AEP—N-(2-aminoethyl)piperazine
HEP—N-(hydroxyethyl)piperazine

Catalyst Preparation

The functionalized zirconium phosphonate catalysts were prepared by a method disclosed in U.S. Pat. No. 4,298,723.

Into a 500 cc. round bottom flask equipped with thermometer, stirrer, reflux condenser and addition funnel approximately 21 g (0.10 mole) trimethylenediphosphonic acid and 35 cc. H$_2$O were added. Another mixture of 25 g zirconyl chloride (0.14 mole), 27 g water, and 5 ml 48% HF (aq) was added to the acid solution with mixing at room temperature over a 10–15 minute period. An additional 150 cc. H₂O was added to fluidize the white solids. The mixture was then heated to a gentle reflux (90°–95° C.) and purged with a light stream of N₂ to remove the HF. Reflux continued overnight.

The white solids were filtered and washed with H₂O, acetone, and ether and dried to a constant weight. The yield was 37.1 g zirconium trimethylene diphosphonate.

5669-85

The same procedure was used except carboxymethyl phosphonic acid was used.

5669-57

The same procedure was used except phenylphosphonic acid was used.

EXAMPLE I. 5718-97

Approximately 40 g of a 1:1 molar mixture of monoethanolamine and ethylenediamine was added to a 300 cc glass-lined rocking autoclave. 4.0 g of zirconium phenylphosphonate (10% by wt.) was added to the clave. The clave was flushed two times with N₂ and heated to 315° C. for two hours with rocking. The reactor was then cooled, the contents removed and the catalyst removed by filtration. The product was analyzed by G.C. (see Table 1).

EXAMPLE II. 5718-98

The same procedure was used as in Example I, except 3.9 g zirconium carboxymethyl phosphonate was used. The product was analyzed by G.C. (see Table 1).

EXAMPLE III. 5797-7

The same procedure was used as in Example I, except 4.1 g zirconium trimethylene diphosphonate was used. The product was analyzed by G.C. (see Table 1).

EXAMPLE IV. 5797-11

The same procedure was used as in Example I, except that 3.8 g zirconium phenylphosphonate was used. The product was analyzed by G.C. (see Table 1).

TABLE 1

| Area, % | I | II | III | IV |
| --- | --- | --- | --- | --- |
| EDA | 51.10 | 43.46 | 38.25 | 42.30 |
| MEA | 31.83 | 31.81 | 22.94 | 31.86 |
| PIP | 1.23 | 1.14 | 2.97 | 0.84 |
| DETA | 8.78 | 12.54 | 14.08 | 12.18 |
| AEEA | 1.07 | 1.23 | 0.58 | 2.45 |
| AEP/HEP | 0.93 | 0.52 | 4.04 | 0.76 |
| NTEA | 0.16 | 0.43 | 0.13 | 0.36 |
| TETA | 2.40 | 3.61 | 5.18 | 3.36 |
| DIAEP | 0.25 | 0.13 | 1.41 | 0.21 |
| PEEDA | 0.31 | 0.10 | 1.63 | 0.24 |
| AETETA | 0.20 | 0.33 | 0.74 | 0.27 |
| TEPA | 0.72 | 0.89 | 2.33 | 0.79 |
| AEPEEDA | 0.25 | 0.14 | 1.38 | 0.23 |
| PEDETA | 0.09 | 0.14 | 0.66 | 0.20 |
| PEHA | 0.10 | 0.08 | 0.18 | 0.33 |
| HEDETA EDA | 0.08 | 0.10 | — | 0.58 |
| % conversion MEA | Low | 14 | 24 | 15 |
| % conversion | 36 | 36 | 54 | 36 |
| DETA/PIP | 7.15 | 11.0 | 4.7 | 14.6 |
| L/C | 4.4 | 8.9 | 1.9 | 7.3 |

As can be seen from the results set forth in Table 1, good results were obtained in the reaction of ethylenediamine with monoethanolamine using the catalysts of the present invention. Note in particular the ratio of linear products (L) to cyclic products (C) in the bottom line of the table indicating the predominantly linear character of the reaction products.

The foregoing examples have been given by way of illustration only and are not intended as limitations on the scope of the present invention, which is defined by the following claims:

What is claimed is:

1. In a method wherein monoethanolamine is reacted with ethylenediamine in the presence of a catalyst to provide an essentially noncyclic product comprising polyethylenepolyamines, the improvement for conducting said process which comprises:

(a) using, as the catalyst, an intercalatively catalytically active tetravalent zirconium polymeric reaction product of an organo phosphonic acid or an ester thereof with a compound of tetravalent zirconium reactive therewith; and (b) contacting a mixture of ethylenediamine and monoethanolamine in the molar ratio of about 1 to about 5 moles of ethylenediamine per mole of monoethanolamine with said catalyst at a temperature of about 250° to about 400° C.

2. A method as in claim 1 wherein the tetravalent zirconium compound is zirconyl chloride and wherein the organo phosphonic acid is trimethylenediphosphonic acid.

3. A method as in claim 1 wherein the zirconium compound is zirconyl chloride and wherein the organo phosphonic acid is carboxymethyl phosphonic acid.

4. A method as in claim 1 wherein the zirconium compound is zirconyl chloride and wherein the organo phosphonic acid is phenylphosphonic acid.

5. In a method wherein monoethanolamine is reacted with ethylenediamine in the presence of a catalyst to provide an essentially noncyclic reaction product comprising polyethylenepolyamines, the improvement for conducting said process which comprises:

(a) using, as the catalyst, an intercalatively catalytically active tetravalent zirconium polymeric reaction product of an organo phosphonic acid with a tetravalent zirconium halide, said polymeric reaction product containing a molar ratio of phosphorous to zirconium of about 2 to 1;

the organo groups of said polymeric reaction product being covalently bonded to phosphorous through a carbon linkage and the phosphorous being bonded to the zirconium through an oxygen linkage; and (b) contacting a mixture of ethylenediamine and monoethanolamine in a molar ratio of about 1 to about 5 moles of ethylenediamine per mole of monoethanolamine with said catalyst at a temperature of about 250° to about 400° C. and a pressure of about 500 to about 3000 psig. to obtain an essentially noncyclic reaction product.

6. A method as in claim 5 wherein the zirconyl halide is zirconyl chloride.

7. A method as in claim 6 wherein the phosphonic acid is trimethylene diphosphonic acid.

8. A method as in claim 6 wherein the phosphonic acid is carboxymethyl phosphonic acid.

9. A process as in claim 6 wherein the phosphonic acid is phenyl phosphonic acid.

10. In a method wherein monoethanolamine is reacted with ethylenediamine in the presence of a catalyst to provide an essentially noncyclic reaction product comprising polyethylenepolyamines, the improvement for conducting said process which comprises:

a. using a catalyst consisting essentially of an intercalatively catalytically active tetravalent zirconium polymeric reaction product prepared by reacting an alkylenediphosphonic acid, a carboxymethylphosphonic acid or a phenylphosphonic acid with an amount of a tetravalent zirconium halide sufficient to provide a polymeric reaction product having a molar ratio of phosphorous to zirconium of about 2 to 1;

the organo groups of said polymeric reaction product being covalently bonded to phosphorous through a carbon linkage and the phosphorous being bonded to the zirconium through an oxygen linkage; and b. contacting a mixture of ethylenediamine and monoethanolamine in a molar ratio of about 1 to 5 moles of ethylenediamine per mole of monoethanolamine with said catalyst at a temperature of about 250° to about 400° C. and a pressure of about 500 to about 3000 psig to obtain an essentially noncyclic reaction product comprising diethylenetriamine.

11. A method as in claim 10, wherein the zirconyl halide is zirconyl chloride.

12. A method as in claim 11, wherein the phosphonic acid is trimethylenediphosphonic acid.

13. A method as in claim 11, wherein the phosphonic acid is carboxymethyl phosphonic acid.

14. A method as in claim 11, wherein the phosphonic acid is phenyl phosphonic acid.

* * * * *